Aug. 12, 1958  J. C. MASON  2,846,909
POWER-DRIVEN PIPE TONG
Filed June 24, 1954 4 Sheets-Sheet 2

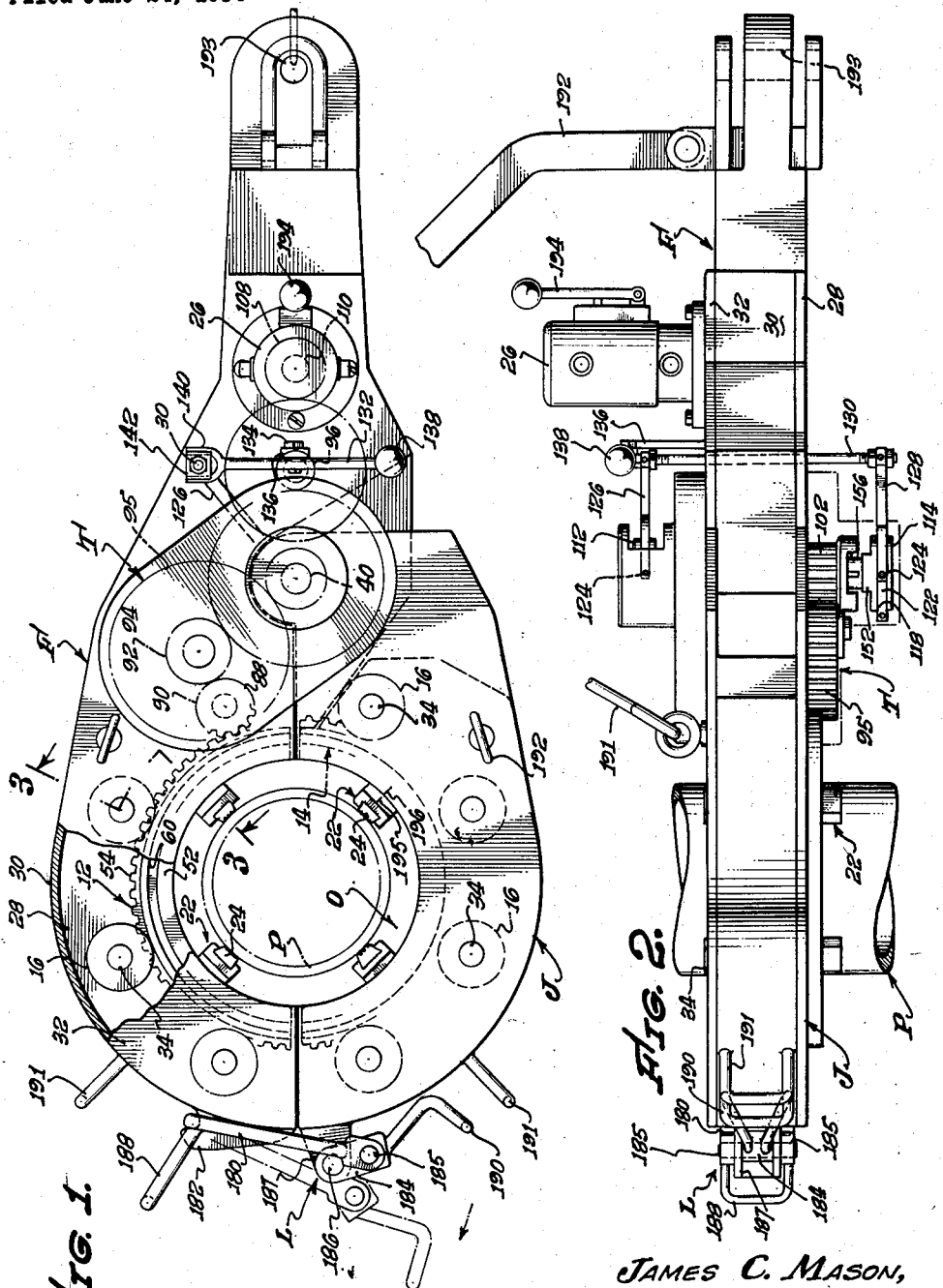

JAMES C. MASON,
INVENTOR.

BY
William C. Babcock
ATTORNEY.

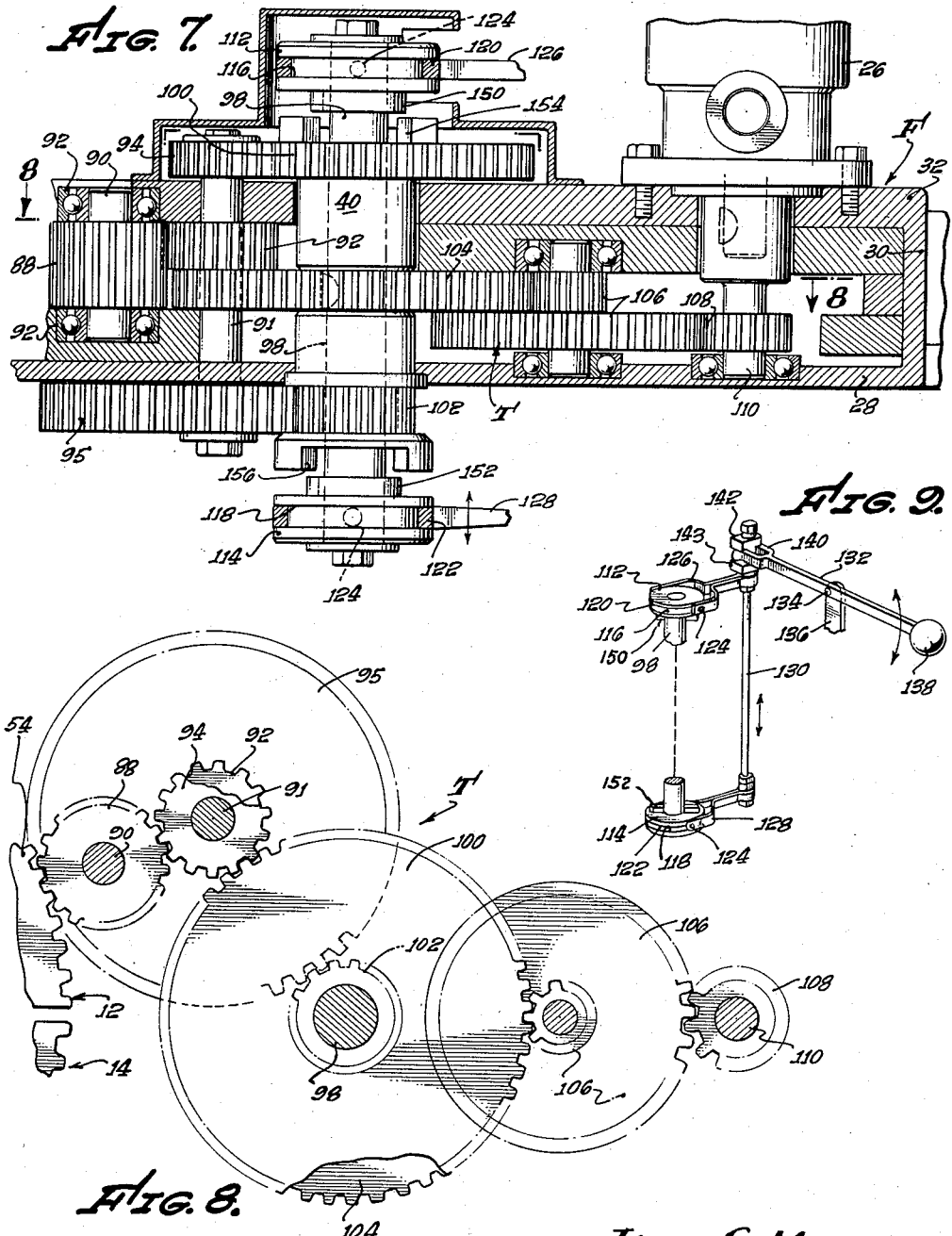

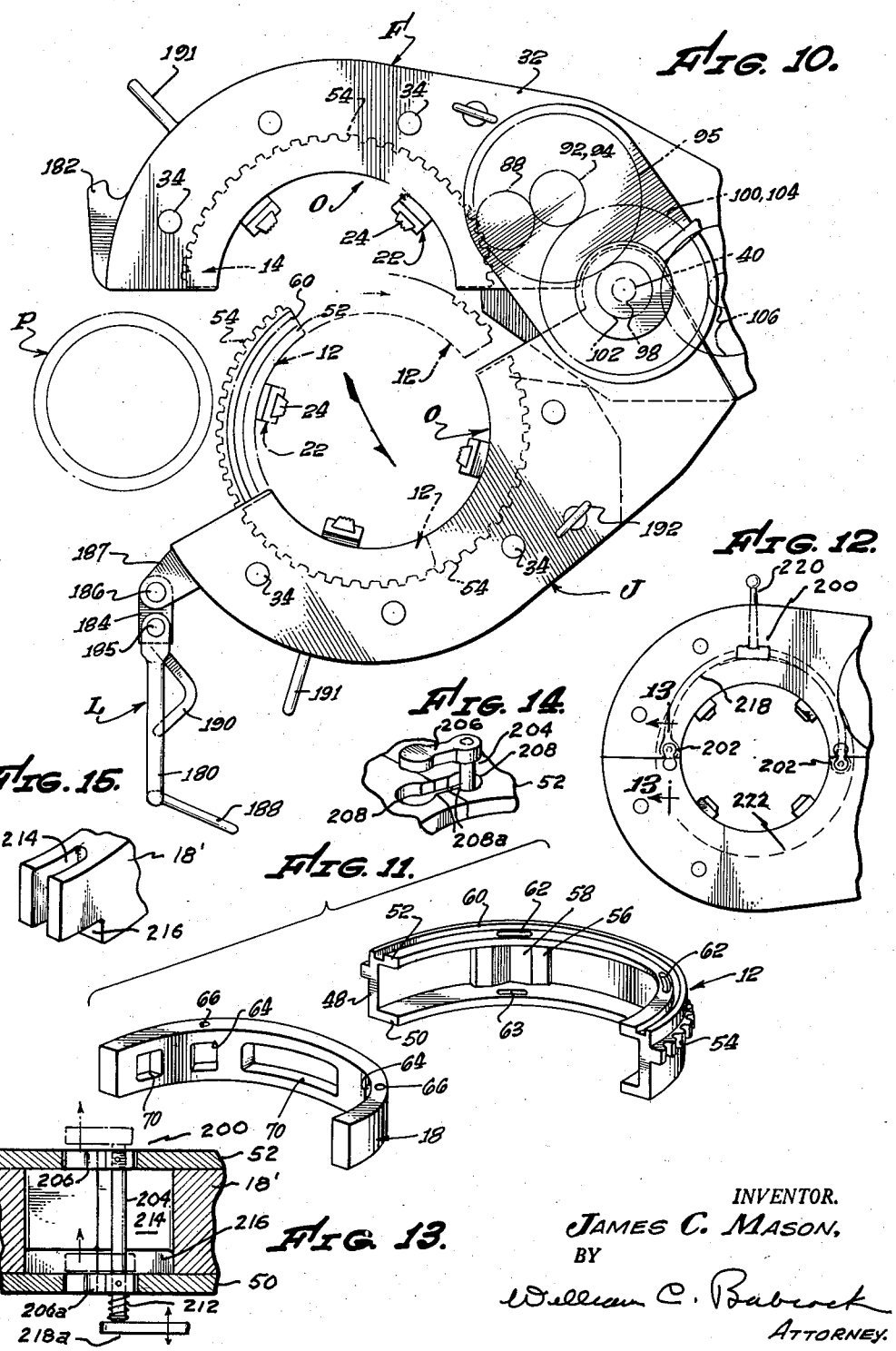

United States Patent Office 2,846,909
Patented Aug. 12, 1958

2,846,909
POWER-DRIVEN PIPE TONG

James C. Mason, Paramount, Calif., assignor, by direct and mesne assignments, to Mason-Carlton Tool Co., Inc., a corporation of California Application June 24, 1954, Serial No. 439,061

8 Claims. (Cl. 81—53)

The present invention relates generally to the field of oil tools, and more particularly to a novel power-driven pipe tong.

Power-driven pipe tongs are widely employed in the drilling and the production of oil. These tongs are utilized to screw and unscrew the threaded ends of the strings of casings, drill pipe and tubing employed in the bore hole of an oil well. The use of such tongs results in a considerable saving of time and money. Additionally, power-driven tongs are safer to use than conventional pipe tongs.

It is a major object of the present invention to provide a new and improved form of power-driven pipe tong.

Another object of the invention is to provide a single tong which is capable of both making and breaking the pipe joint as well as spinning it in or out. The making and breaking operation may be accomplished without the use of a cathead, or the like.

A further object is to provide a power-driven pipe tong which is capable of imparting a considerable amount of torque to a pipe joint without damaging such pipe joint.

Yet another object of the present invention is to provide a power-driven pipe tong, which while capable of imparting a considerable amount of torque to a pipe joint, is of compact size having comparatively small overall dimensions and is light in weight.

An additional object is to provide a power-driven pipe tong which may be readily applied to and removed from a pipe joint.

Yet a further object of the invention is to provide a power-driven pipe tong which is extremely simple of design and rugged of construction whereby it may afford a long and useful service life.

Another object is to provide a power-driven pipe tong which is capable of joining and unjoining a pipe joint in a minimum amount of time.

It is yet another object to provide such a tong which is simple and foolproof in operation.

These and other objects and advantages of the present invention will become apparent from the following detailed description of a preferred embodiment thereof, when taken in conjunction with the appended drawings wherein:

Figure 1 is a top plan view of a preferred form of power-driven pipe tong embodying the present invention, the cover of said tong being partly broken away in the interest of clarity;

Figure 2 is a side elevational view of said tong;

Figure 7 is an enlarged vertical sectional view showing the transmission utilized with said tong;

Figure 8 is a diagrammatic top view of said transmission;

Figure 9 is a perspective view of a control mechanism utilized with said tong;

Figure 10 is a fragmentary top plan view showing said tong arranged with its parts in a pipe-receiving position;

Figure 11 is an exploded perspective view of a detail of said tong;

Figure 12 is a plan view of an alternate form of the invention in which the half rings may be removably locked together;

Figure 13 is a framentary vertical cross-sectional view of a half ring junction showing the locking mechanism in detail;

Figure 3:
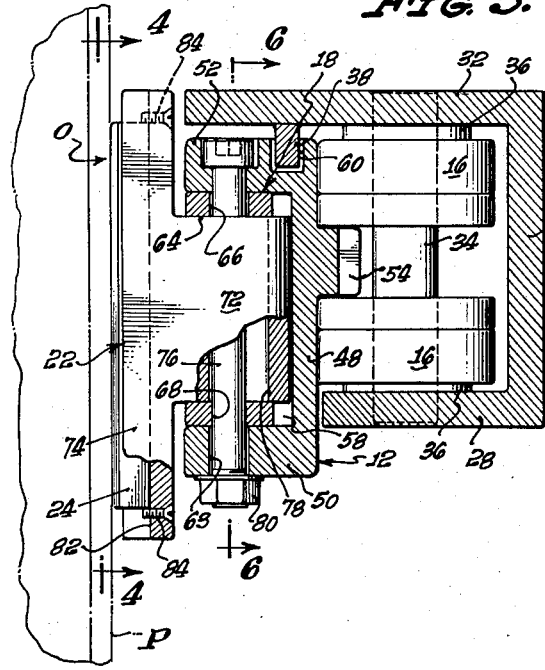
Figure 3 is an enlarged vertical sectional view taken on line 3—3 of Figure 1.
Figure 4:
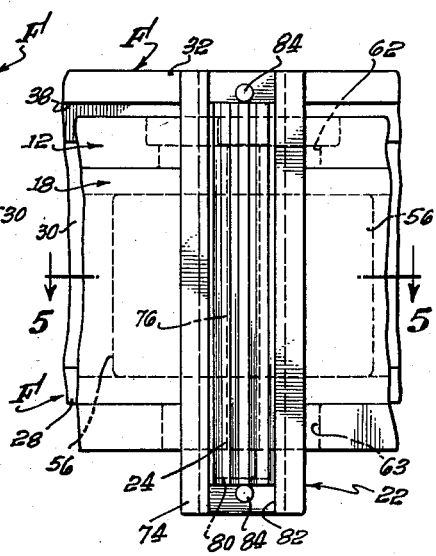
Figure 4 is a fragmentary elevational view taken from a point generally designated 4—4 in Figure 3.

Figure 14 is a fragmentary perspective view showing the arrangement of the top flanges of the half rings at a junction thereof, one of the vertically movable locking keys, and the recesses formed in said flanges in which said key resides when in locking position; and, Figure 15 is a fragmentary perspective view of one end portion of one of the die carrier half rings when modified for use with the alternate form of the invention.

Referring to the drawings, and particularly to Figures 1, 2 and 10 thereof, it will be seen that the preferred form of power-driven pipe tong embodying the present invention includes a frame member F to which a jaw member J is pivotally affixed that is adapted to be secured in a closed position shown in Figure 1 by a latch L. The frame member F and the jaw member J are formed with a circular pipe-receiving opening O from a well pipe P may be removed or into which it may be inserted when the jaw member J is disposed in an open position relative to the frame member F, as indicated in Figure 10. A pair of identical support half-rings 12 and 14 are rotatably disposed within the pipe-receiving opening O by a plurality of rollers 16. The support half-rings 12 and 14 in turn each mount a semi-circular die carrier, which die carriers are identical and are designated 18. Die carriers 18 support a plurality of pipe-engaging elements in the form of identical block elements 22 that each mount a pipe-engaging die 24. A motor 26 mounted at the rear portion of the frame member F serves to effect rotation of the support half-rings 12 and 14, and hence rotation of the die carriers 18. Rotation of the motor 26 is transferred to the support half-rings 12 and 14 through a variable speed transmission T.

More particularly, the frame member F includes a bottom wall 28, a side wall 30, and a top wall or cover 32, the edges of which walls are integrally joined. Referring to Figure 3, it will be seen that each of the rollers 16 is rotatably carried by a vertical shaft 34, having its lower and upper ends secured to the bottom and top walls 28 and 32, respectively. Each shaft 34 carries a pair of the rollers 16, and a washer 36 is interposed between each roller and the adjoining wall of the frame member. An integral arcuate guide flange 38 depends from the top wall 32 radially inwardly of the shafts 34.

The jaw member J is pivotally secured at its rear portion to the frame member F by a vertical pivot pin 40. This jaw member is generally similar in construction to the front portion of the frame member F, having bottom, side and top walls. The rollers 16 of the jaw member are mounted in a manner identical to that previously described with regard to the frame member F.

Figure 5:
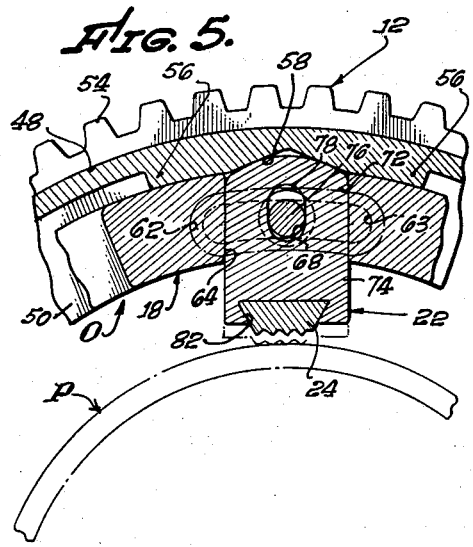
Figure 5 is a horizontal sectional view taken on line 5—5 of Figure 4.

Each support half-ring 12 and 14 includes a vertical wall 48 and a radial inwardly extending bottom flange 50 and a radial inwardly extending top flange 52. The intermediate portion of the vertical wall 48 is integrally formed with radially outwardly extending gear teeth 54. These gear teeth are disposed between the vertical space separating the rollers 16, while the exterior surface of the vertical wall 48 has rolling contact with the rollers 16, as shown in Figure 3. The interior of the vertical wall 48 is formed with a pair of integral wedging members 56 having a wedge-shaped pocket 58 for receiving the pointed outer ends of the block elements 22, as shown in Figure 5. The top flange 52 is formed with an arcuate groove 60 that receives the guide flange 38. The top and bottom flanges 52 and 50 are also formed with a pair of arcuate slots 62 and 63 respectively, having their centers aligned with the centers of the pockets 58.

Figure 6:
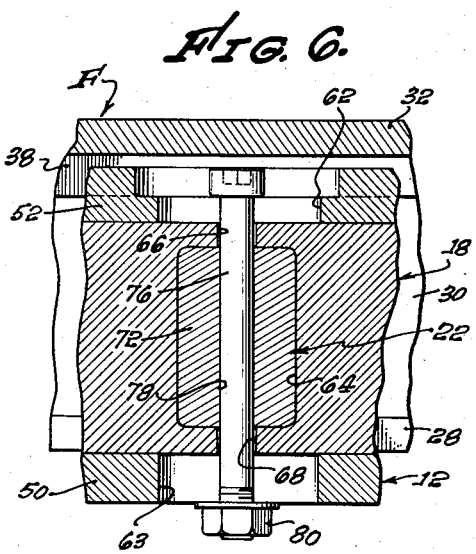
Figure 6 is a vertical sectional view taken on line 6—6 of Figure 3.

The die carriers 18 are disposed between the bottom and top flanges 50 and 52 of the support half-rings 12 and 14, as shown in Figure 3. Each of the die carriers 18 is formed with a generally rectangular radially extending opening 64 adapted to be disposed radially inwardly from the wedging member pockets 58. Vertically aligned bores 66 and 68 extend from the top and bottom of opening 64 as indicated in Figure 6. Lightening holes 70 may also be formed in each of the support half-rings as shown in Figure 11.

The block elements 22 include a main portion 72 and a die mounting portion 74. The main portion 72 is slidably disposed within one of the openings 64 of the support half-rings 12 and 14. The main portions are retained within these openings by vertically extending bolt elements 76 that are positioned within vertically extending, radially directed slots 78 formed in each of the main portions. As shown in Figure 6, the lower end of each bolt 76 is positioned within the arcuate slots 63 of the bottom support half-ring flange 50, while the upper or head end thereof is disposed within one of the arcuate slots 62 of the top flange 52 thereof. A nut 80 is threaded to the lower end of each bolt 76. The die mounting portion 74 of each block element 22 is formed with a vertically extending wedge-shaped slot 82 for receiving one of the pipe-engaging dies 24. Bolts 84 may be utilized to secure these dies in place within their slots. The outer end of each of the main portions 72 is arcuate in shape and is disposed within one of the wedge-shaped pockets 58.

Referring to Figures 7 and 8, the support half-rings 12 and 14 are caused to rotate relative to the frame element F and jaw member J by engagement of the gear teeth 54 of these rings with the teeth of a toothed driving roller 88 mounted by the frame. This driving roller 88 is carried by a shaft 90 that is disposed between a pair of bearings 92 mounted by the frame. The drive roller 88 is alternately adapted to be driven under low speed, high torque operating conditions or high speed comparatively low torque operating conditions by the transmission T. The transmission T includes a vertical drive shaft 91 to which are keyed an intermediate pinion 92 having its teeth engaged with those of the driving roller 88, an upper pinion 94 and a lower pinion 95, the lower pinion being of considerably greater diameter than the upper pinion.

A clutch mechanism is disposed rearwardly of the drive shaft 91 and it includes a vertical shaft 98 which is rotatable and vertically movable relative to the frame F. An upper gear 100 and a lower gear 102 are rotatably journaled by the shaft 98, the shaft being movable vertically relative to said gears. The upper gear 100 is seen to be of considerably greater diameter than the lower gear 102. The teeth of the upper gear 100 are constantly engaged with those of the upper pinion 94, while the teeth of the lower gear 102 are constantly engaged with those of the lower pinion 95. An intermediate gear 104 is keyed to the mid-portion of the shaft 98 so as to be locked against relative rotation with respect thereto, but with the shaft being movable vertically relative to the gear. The intermediate gear 104 is adapted to effect rotation of the drive shaft by virtue of its engagement with an idler gear assembly 106, which idler gear assembly is in turn engaged with the teeth of a pinion 108 that is keyed to the shaft 110 of the motor 26.

It should be understood that rotation of the motor shaft 110 is alternately adapted to be transferred to either the upper gear 100 or to the lower gear 102. When the upper gear 100 is being rotated, it will in turn rotate the upper pinion 94, the intermediate pinion 92, and hence the driving roller 88. The latter will then be rotated at a high speed with a comparatively low torque. This is the condition represented in Figures 7 and 8. When the lower gear 102 is being rotated by the motor 26 it will in turn rotate the lower pinion 95, the intermediate pinion 92, and hence the driving roller 88. The latter will then be rotated at a comparatively low speed but with a high amount of torque.

Vertical movement of the clutch shaft 98 may be effected by means of an upper clutch disc 112 and a lower clutch disc 114. The clutch discs are keyed to the upper and lower ends of the shaft 98, respectively. These discs are each formed with circumferential grooves 116 and 118, respectively, wherein are disposed rings 120 and 122, the discs being rotatable relative to the rings. As shown in Figure 9, the rings 120 and 122 are affixed to pin elements 124 which are carried between the bifurcations of a pair of shifting forks 126 and 128. The opposite end of these shifting forks are rigidly secured to the upper and lower portion of a rod 130 that is supported for vertical movement by the frame F. Vertical movement of the rod 130 may be effected by a control arm 132 having its intermediate portion pivotally connected at 134 to a rigid frame member-connected element 136. The control arm 132 is formed at one end of a knob 138 and at its opposite end with a fork 140 having its bifurcations disposed between a pair of pad elements 142 and 143 that are rigidly mounted by the upper end of the rod 130. With this arrangement pivotal movement of the control arm 136 about point 134 will effect concurrent vertical movement of the rod 130. Such vertical rod movement will in turn be transmitted to the clutch discs 112 and 114 so as to effect their vertical movement.

The underside of the upper clutch disc 112 and the upper side of the lower clutch disc 114 are formed with lugs 150 and 152. These lugs 150 and 152 are adapted to seat within complementary cavities 154 and 156 formed in the top portion of the upper gear 100 and the bottom portion of the lower gear 102, respectively. Alternately, the lugs 150 and 152 may be disposed clear of both cavities 154 and 156. When the clutch shaft 98 is so positioned vertically that the lugs 150 of the upper clutch disc 112 are seated within the cavity 154 of the upper gear 100, the rotation of such shaft will be transferred by the upper clutch disc to this upper gear. Alternately, when the lugs 152 of the lower clutch disc 114 are seated within the cavity 156 of the lower gear 102, the latter will be rotated by the clutch shaft.

The latch mechanism L is shown in detail in Figures 1, 2 and 10 and it includes a generally U-shaped lock element 180 that is adapted to be hooked about a catch element 182 formed on the frame F. The non-joined ends of the lock element 180 are pivotally secured to one end of a U-shaped toggle element 184 by a pin 185. The toggle element 184 is in turn pivotally secured by a pin 186 at its opposite end between a pair of vertically spaced ears 187, the latter being integrally joined to the jaw member J. A hand hold 188 is secured to the free end of the lock element 180 and a release handle 190 is integrally secured to the pin 185 of the toggle element 184.

The tong may be supported by a suitable hanger device 192 whereby it may be moved toward and away from the pipe P in a generally horizontal direction. The rear end of the frame F is attachable at 193 to a dead line (not shown) for restraining rotation of the tong during a pipe screwing operation. The motor 26 will preferably be of the reversible hydraulic type adapted to receive a hydraulic fluid under pressure from a suitable source (not shown). A control handle 194 is carried by the motor 26 for controlling its rotational speed and direction of rotation. Alternately a separate reversing valve and actuating handle may be provided. Grips 191 may be provided on the front portion of the frame and jaw members to aid in the manipulation thereof.

In operation, referring to Figures 1 and 10, in order to position the tong about a pipe P whereby a joint of the latter may be threaded or un-threaded, the jaw J will first be pivoted in a counter-clockwise direction to an open position relative to the frame F whereby the pipe P may be received within the opening O. Before the J is so pivoted, however, the ends of the support half-rings 12 and 14 must be aligned with the adjoining edges of the frame and jaw members whereby the rollers 16 may support these half-rings when the jaw is moved away from the frame. To effect such alignment the operator may rotate the half-rings with the motor 26 as shown in Figure 1, until a mark 195 on one of the block elements is lined up with a complementary mark 196 on the cover of the jaw J. Next, the latch L will be unlatched so as to free the front end of the jaw from its attachment to the front end of the frame F.

With particular reference to Figure 1, the latch L is so unlatched by first exerting a forwardly directed pull upon the release handle 190 so as to pivot the toggle element 184 in a clockwise direction about the pin 185 from its solid line position of Figure 1 and past its phantom line position of this figure. Next, the hand hold 188 may be utilized to free the lock element 180 from the catch element 182. The jaw J may then be pivoted to its open position of Figure 10.

When the jaw J has been pivoted to an open position, the tong may be moved toward the pipe P and the latter positioned within the opening O. The jaw will then be pivoted in a clockwise direction to its closed position and the latch L will again be latched, the parts of the latch being arranged in their solid line position of Figure 1. Thereafter, assuming that a pipe joint is to be threaded together, the control arm 132 will be so manipulated that the lugs 150 of the upper clutch disc 112 are seated within the cavity 154 of the upper gear 100. The control handle 194 will then be manipulated so as to cause the motor 26 to commence rotation. The rotation of the motor will thus be transferred by the transmission T to the support half-rings 12 and 14 and these members will commence rotation. Such rotation of the support half-rings will cause the sloping sides of the pockets 58 to cam the block elements 22 radially inwardly until the dies 24 engage the pipe joint, the inertia of the die-carriers 18 and the block elements 22 initially resisting the tendency of the support half-rings to rotate the die carriers. Once the dies 24 engage the pipe joint, rotation of the support half-rings 12 and 14 will be transferred directly to the die carriers 18, the block elements 22 and the dies. It will be apparent that the length of the die blocks 22 must be such to permit the dies 24 to contact the surface of the particular diametered pipe P on which work is being done when the die blocks are initially caused to move relative to pockets 58. Thus, when pipe P of small diameter is to be engaged by dies 24, longer die blocks 22 will be required than when a pipe of larger diameter is to be so engaged.

The initial rotation of the pipe P will take place under high speed, comparatively low torque conditions inasmuch as the upper gear 102 is engaged with the upper pinion 94. When the pipe joint threads have been spun in to the extent possible with the aforementioned transmission setting, the control arm 132 will be so manipulated that the lugs 152 of the lower clutch disc 114 are seated within the cavity 156 of the lower gear 102. The drive roller 88 and hence the support half-rings will then be rotated under a reduced speed but high torque condition whereby the pipe joint threads will be properly made up. If the pipe joint is to be unthreaded, the reversal of the above procedure is followed.

After the pipe joint has been made up the release handle 190 of the latch toggle element 184 will be pulled forwardly to its phantom line position of Figure 1. This operation will permit the front end of the jaw J to move a slight distance away from the front of the frame F in a counter-clockwise direction. The motor 26 will then be operated in a reversed direction of rotation from that utilized to thread the pipe joint. Such motor rotation will be transferred to the support half-rings 12 and 14 whereby the sides of the pockets 58 will cam the block elements 22 and hence the dies 24 away from the pipe P. During such block element movement, the die carriers 18 will rotate slightly relative to the support half-rings and the block elements 22, the arcuate slots 62 and 63 permitting such movement to occur. After the dies 24 have been retracted from the pipe P, the ends of the support half-rings 12 and 14 will again be aligned with the adjoining edges of the frame and jaw member. Thereafter, the hand hold 188 of the latch L will be employed to free the lock element 180 from the catch element 182, and this hand hold and the adjoining grip 191 may be employed to swing the jaw into an open position. The tong may then be moved away from the pipe P.

When the present invention is used for heavy work, such as breaking loose casing that has been installed in a hole for a number of years, it is desirable that the half-rings 12 and 14 be positively locked together as an integral unit. To provide such a locked half-ring arrangement, yet one that will permit separation of said half-rings as previously described in detail and illustrated in Figure 14, the mechanism 200 shown in Figures 12, 13 and 14 is provided. The actual locking together of half-rings 12 and 14 is achieved by means of two sets of vertically movable keys, denoted generally by the numeral 202, and shown in Figures 13 and 14. Each set 202 includes a vertically disposed rod 204 on the upper end of which a horizontally positioned dumbbell-shaped key 206 is mounted, with a second identical key 206a being so situated on the rod that the vertical spacing of the keys is the same as that of the flanges 50 and 52 on the half-rings 12 and 14.

In this alternate form of the invention the half-rings 12 and 14 are altered to the extent that each half-ring has curved recesses 208 formed in the abutting end portions of flanges 50 and 52, which recesses when the end faces of the half-rings are in juxtaposition, provide a dumbbell-shaped opening 208a (Figure 14) in which one of the keys 206 may be removably and snugly inserted. Although only the flanges 52 are shown in Figure 14, flanges 50 have like openings 208a formed therein, and are shown in elevation in Figure 13. A helical spring 212 is provided for each set of keys 202, which spring is at all times so deformed as to tend to maintain keys 206 within the confines of openings 208a whereby the half-rings 12 and 14 are locked together.

Each set of keys 202 is vertically movable from the locking position shown in solid line in Figure 13 to the phantom line position shown in that figure, in which latter position half-rings 12 and 14 may be separated. It will be apparent that inasmuch as the die carrier half-rings 18 are in abutment when disposed in half-rings 12 and 14, each die carrier half-ring must be modified to a form 18'. The die carrier half-rings 18' differ from the previously described form 18 in that a curved, vertical slot 214 is formed in each end portion of the modified carrier and communicates with a downwardly disposed recess 216. In Figure 13 it will be seen that the rod 204 extends upwardly in the slots 214, with the lowermost key 206 being disposable in one of the recesses 216. Thus, relative rotational movement may take place between half-rings 12 and 14, and the die carrier half-rings 18' to advance or contract the block elements 22 without the sets of keys 202 in any way interfering with the operation, for when keys 206 and rod 204 are not in locked position, as shown in phantom line in Figure 13, they merely travel in the slots 214 and recesses 216.

In order that the two sets of keys 202 may be lifted concurrently to the phantom line position shown in Figure 13, a semi-circular yoke 218 is provided, and is pivotally supported at substantially its mid-point on the underside of frame F. The yoke extremities 218a are disposed under the two sets of keys 202, whereby when a handle 220 rigidly affixed to the yoke is moved downwardly, the extremities 218a are moved upwardly to displace keys 206 from openings 208a to those positions shown in phantom line in Figure 13.

From a practical standpoint, the only reason for moving the sets of keys 202 out of engagement with half-rings 12 and 14 is to permit the tong jaws J to open as shown in Figure 10. Accordingly, that yoke extremity 218a adjacent the pivot pin 40 must extend under the movable jaw J a sufficient distance to prevent disengagement therefrom of the set of keys 202 associated with this particular extremity due to the outward swing of this jaw. It will be apparent that the set of keys 202 nearest pin 40 when the movable jaw is pivoted relative to the stationary jaw, travel a curved path, and one having a radius of curvature, the fixed center of which is the pin 40.

The only other modification of the preferred form of the invention necessary to convert it to the alternate form is the removal of that portion of frame F inwardly from the phantom circle 222 shown in Figure 12. The purpose in removing this frame portion is to allow the uppermost keys 206 to be raised to the phantom line positions of Figure 13 whereby the sets of keys 202 are visible at all times as they rotate with half-rings 12 and 14. Such visibility is necessary in order that they may be disposed in alignment with the abutting edges of jaws J prior to separation thereof (Figure 10).

Operation of the alternate form of the invention is identical to that of the first form which has been previously described in detail, with the exception that in addition to locking or unlocking the jaws J by use of latch L, the half-rings 12 and 14 must also be locked or unlocked by manipulation of the yoke handle 220. It has been found from experience that locking of the half-rings 12 and 14 is desirable when the tongs are to be used on heavy work, such as that of breaking loose old casing.

From the foregoing description it will be observed that there has been provided an improved power-driven pipe tong which lends itself to compact and lightweight construction, especially where alloys of high-strength and low-weight characteristics are utilized. It will also be apparent that various modifications and changes may be made with regard to the form of tong shown and described herein without departing from the spirit of the invention or the scope of the following claims.

I claim:

1. A power-driven pipe tong, comprising: a frame member; a jaw member pivotally secured to said frame member that cooperates therewith to define a pipe-receiving opening; track means formed on said members and encompassing said opening; a pair of support half rings rotatably mounted on said track means; two semi-circular die carriers rotatably mounted on said half rings; a plurality of circumferentially spaced, radially movable die blocks mounted on said die carriers; cam means disposed at fixed positions relative to said half rings, which cam means is slidably engaged by the exterior ends of said die blocks when said die carriers are rotated in either of two possible directions relative to said half rings, with said die blocks being moved inwardly when said slidable movement takes place; latch means for releasably locking said frame and jaw members together; power means; and variable speed transmission means that connect said power means to said half rings to rotate the same, said transmission means being capable of permitting said power means to suddenly rotate said half rings so as to cause initial relative movement between said half rings and said die carriers due to the inertia of the latter to the extent that before rotating with said die carriers and half rings said blocks are first moved inwardly to grip the exterior surface of a pipe disposed in said opening.

2. A power-driven pipe tong as defined in claim 1 in which two vertically spaced, arcuate flanges are provided that extend inwardly from the upper and lower edge portions of each of said half rings, between which half rings said die carriers are rotatably supported.

3. A power-driven pipe tong as defined in claim 2 in which said cam means are cam faces formed on the interior surfaces of said half rings.

4. A power-driven pipe tong as defined in claim 2 in which said die blocks are formed with curved convex outer end portions and said cam means are curved pockets formed on the interior surfaces of said half rings and in axial alignment with said blocks.

5. A power-driven pipe tong as defined in claim 4 in which said die carriers have a plurality of circumferentially spaced, radially extending openings formed therein that are radially alignable with said pockets and said die blocks are slidably mounted in said openings.

6. A power-driven pipe tong as defined in claim 5 in which said flanges have a plurality of arcuate slots formed therein that are radially aligned with said pockets, said die carriers have a plurality of vertically disposed, circumferentially spaced bores formed therein that communicate with said openings, said die blocks are formed with elongate, radially extending, vertically disposed slots therein, and a plurality of bolts are provided that extend through said bores and slots.

7. A power-driven pipe tong as defined in claim 6 including a plurality of keys that removably engage a plurality of openings formed in said half rings to lock said half rings together as an integral whole, which keys are removable from said openings when said half rings are so disposed as to permit separation thereof from said members when said tongs are opened.

8. A power-driven pipe tong as defined in claim 6 in which said transmission means is capable of selectively providing either high-speed, low-torque operating conditions or low-speed, comparatively high-torque operating conditions.

References Cited in the file of this patent

UNITED STATES PATENTS

| | | |
|---|---|---|
| 1,902,216 | Buttress | Mar. 21, 1933 |
| 1,923,010 | Johansen | Aug. 15, 1933 |
| 1,955,727 | Adams | Apr. 24, 1934 |
| 2,305,624 | Lange et al. | Dec. 22, 1942 |
| 2,550,045 | De Hetre | Apr. 24, 1951 |